United States Patent
Shiraishi et al.

(10) Patent No.: US 12,078,517 B2
(45) Date of Patent: Sep. 3, 2024

(54) ENCODER INCLUDING MOVING PLATE, IRRADIATOR, LIGHT RECEIVER AND DETERMINATION PART TO SPECIFY ERROR POSITION

(71) Applicant: Panasonic Intellectual Property Management Co., Ltd., Osaka (JP)

(72) Inventors: Masaru Shiraishi, Osaka (JP); Shuichi Nagai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/247,887

(22) PCT Filed: Sep. 6, 2021

(86) PCT No.: PCT/JP2021/032674
§ 371 (c)(1),
(2) Date: Apr. 5, 2023

(87) PCT Pub. No.: WO2022/107421
PCT Pub. Date: May 27, 2022

(65) Prior Publication Data
US 2023/0375373 A1    Nov. 23, 2023

(30) Foreign Application Priority Data
Nov. 20, 2020   (JP) ................. 2020-192971

(51) Int. Cl.
*G01D 5/347*   (2006.01)
(52) U.S. Cl.
CPC ....... *G01D 5/3473* (2013.01); *G01D 5/34715* (2013.01)

(58) Field of Classification Search
CPC ............ G01D 5/3473; G01D 5/34715; G01D 5/24471; G01D 5/34792
See application file for complete search history.

(56) References Cited

U.S. PATENT DOCUMENTS

| 10,060,772 B2* | 8/2018 | Drescher ............. G01D 18/008 |
| 2016/0094336 A1* | 3/2016 | Schenzinger ....... H04L 25/4908 375/295 |
| 2016/0178407 A1 | 6/2016 | Yoshida et al. |

FOREIGN PATENT DOCUMENTS

| JP | 06-006261 | 1/1994 |
| JP | 2007163313 A * | 6/2007 |

(Continued)

OTHER PUBLICATIONS

International Search Report of PCT application No. PCT/JP2021/032674 dated Nov. 9, 2021.

*Primary Examiner* — Thanh Luu
*Assistant Examiner* — Mai Thi Ngoc Tran
(74) *Attorney, Agent, or Firm* — Rimon P.C.

(57) ABSTRACT

Provided is an encoder capable of suppressing a decrease in detection accuracy. The encoder includes a moving plate, a light irradiator that irradiates a code pattern with light, and a light receiver. The code pattern includes a light guider and a non-light guider. A code pattern array is an array in which an error correction code for correcting an error is inserted into a position information data string that can specify a position. The light receiver includes a position detecting light receiving element that reads a position array of a code pattern and a position correcting light receiving element that outputs information for correcting an error.

14 Claims, 14 Drawing Sheets

(56) References Cited

FOREIGN PATENT DOCUMENTS

| JP | 2016-072962 | 5/2016 |
| JP | 2016-118486 | 6/2016 |
| WO | 2018/163424 | 9/2018 |

\* cited by examiner

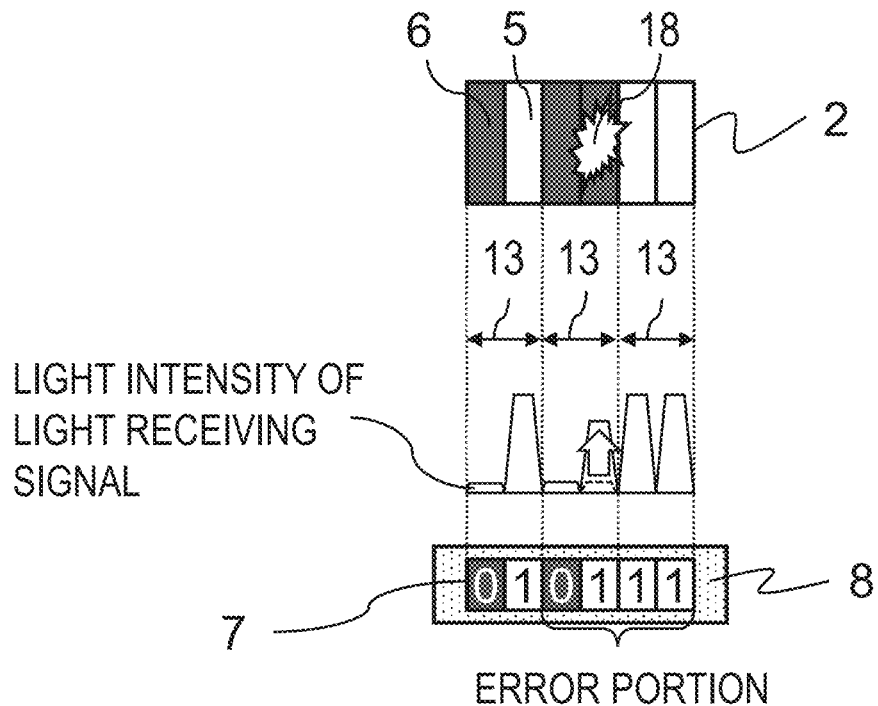
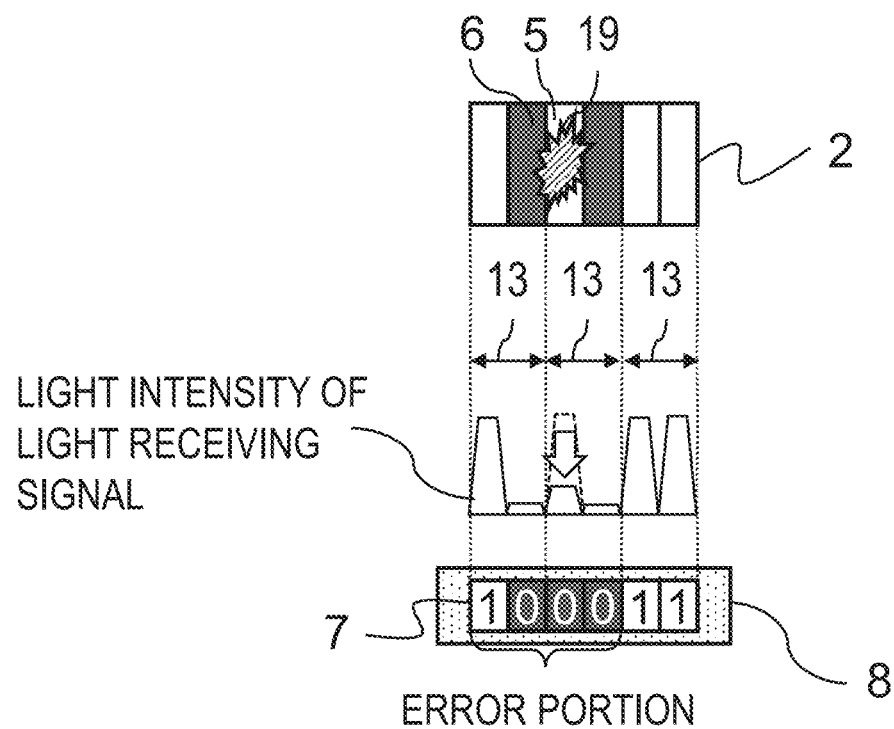

ENCODER INCLUDING MOVING PLATE, IRRADIATOR, LIGHT RECEIVER AND DETERMINATION PART TO SPECIFY ERROR POSITION

CROSS-REFERENCE TO RELATED APPLICATIONS

This application is a U.S. national stage application of the PCT International Application No. PCT/JP2021/032674 filed on Sep. 6, 2021, which claims the benefit of foreign priority of Japanese patent application No. 2020-192971 filed on Nov. 20, 2020, the contents all of which are incorporated herein by reference.

TECHNICAL FIELD

The present disclosure relates to an encoder. In particular, the present disclosure relates to an encoder that detects the rotational position of a rotating body or the moving position of a linear motion body.

BACKGROUND ART

Conventionally, an encoder that detects the rotation of the rotating shaft of a motor is known. For example, Patent Literature 1 discloses an encoder including a pattern along a measurement direction, a light source that emits light to the pattern, and a plurality of light receiving elements arranged along the measurement direction and configured to receive light emitted from the light source and transmitted or reflected by the pattern.

CITATION LIST

Patent Literature

PTL 1: Unexamined Japanese Patent Publication No. 2016-118486

SUMMARY OF THE INVENTION

However, in the encoder described in Patent Literature 1, if dust or the like adheres to the pattern, the dust or the like makes it difficult for light from the light source to be transmitted or reflected, and erroneous detection may occur. In this case, there is a problem that the encoder cannot recognize erroneous detection, and the detection accuracy decreases.

In addition, even if the encoder recognizes that erroneous detection has occurred, it is difficult to correct the error, and there is a problem that the rotational position cannot be detected.

The present disclosure has been made to solve such a problem, and an object of the present disclosure is to provide an encoder capable of detecting an error portion and correcting an error even in the case of erroneous detection.

An encoder according to the present disclosure includes a moving plate, a light irradiator, and a light receiver. The moving plate includes a code pattern. The code pattern includes a light guider and a non-light guider. A code pattern array is an array in which an error correction code for correcting an error is inserted into a position information data string that can specify a position. The light irradiator irradiates the code pattern with light. The light receiver includes a position detecting light receiving element and a position correcting light receiving element. The position detecting light receiving element reads the position array of the code pattern. The position correction light receiving element outputs information for correcting an error.

According to the encoder of the present disclosure, it is possible to recognize and correct a position detection error due to a foreign substance and to suppress a decrease in detection accuracy.

BRIEF DESCRIPTION OF THE DRAWINGS

FIG. 8A is a diagram illustrating an effect of error portion detection when a foreign substance covers one portion of a code pattern in the optical encoder according to the second exemplary embodiment.

FIG. 8B is a diagram illustrating an effect of error portion detection when a foreign substance covers one portion of a code pattern in the optical encoder according to the second exemplary embodiment.

DESCRIPTION OF EMBODIMENT

Hereinafter, an exemplary embodiment of the present disclosure is described. Note that the exemplary embodiment described below illustrates one specific example of the present disclosure. Therefore, numerical values, constituent elements, disposed positions and connection modes of the constituent elements, and steps, order of the steps, and the like shown in the following exemplary embodiment are merely examples, and are not intended to limit the present disclosure. Thus, among the configuration elements in the following exemplary embodiment, configuration elements that are not described in independent claims indicating the highest concept of the present disclosure are described as optional configuration elements.

Further, each of the drawings is a schematic view, and is not necessarily precisely illustrated. Note that, in each of the drawings, substantially the same configurations are denoted by the same reference marks to eliminate or simplify duplicated description.

Figure 1:
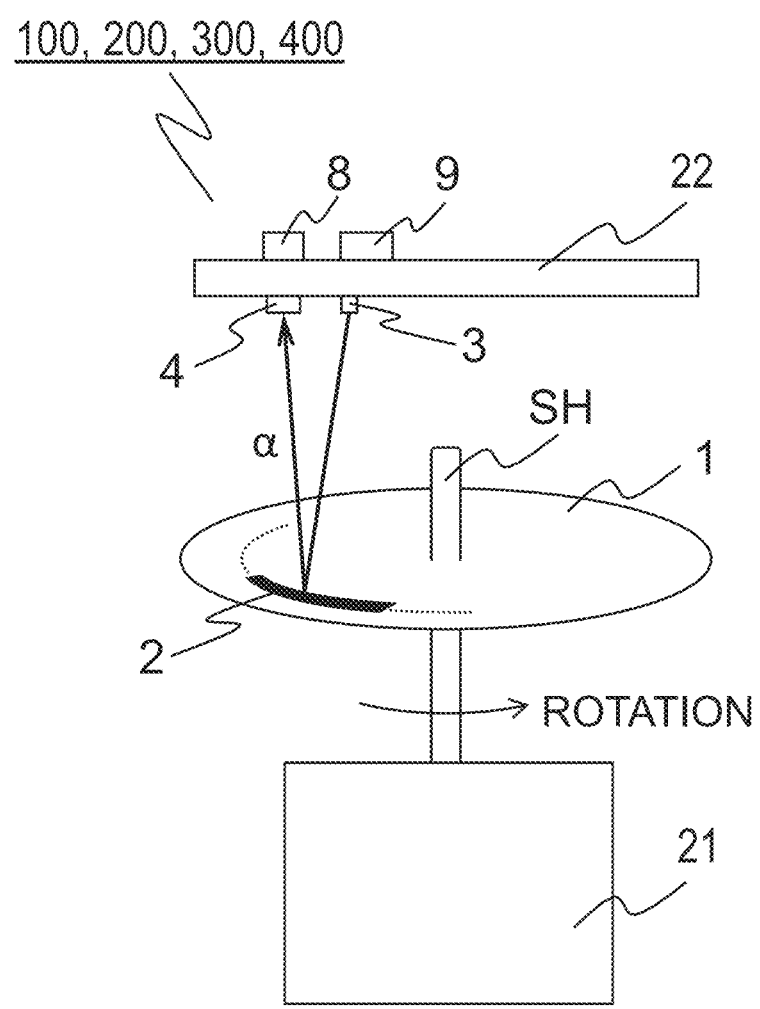
FIG. 1 is a schematic diagram illustrating the configuration of an optical encoder according to the first to fifth exemplary embodiments of the present disclosure.

FIG. 1 is a schematic diagram illustrating the configurations of optical encoders 100, 200, 300, and 400 according to the first to fifth exemplary embodiments of the present disclosure. Optical encoders 100, 200, 300, and 400 include rotating plate 1, light irradiator 3, light receiver 4, determination part 8, and correction part 9. Rotating plate 1 has, for example, a disk shape. For example, rotating plate 1 is attached such that rotating shaft SH of rotating body 21 such as a motor is coaxial with the central axis of rotating plate 1, and the main surface of rotating plate 1 is perpendicular to rotating shaft SH. Code pattern 2 is provided on the main surface of rotating plate 1 at a position opposite to rotating body 21 as viewed from rotating plate 1. Code pattern 2 has a circumference shape centered on rotating shaft SH. Light irradiator 3 and light receiver 4 are provided on the main surface of fixing part 22 as a substrate, with the main surface facing code pattern 2. Determination part 8 and correction part 9 are provided on the surface of fixing part 22 opposite to the main surface on which light irradiator 3 and light receiver 4 are provided. Light irradiator 3 includes, for example, a light emitting diode (LED). Light receiver 4 includes, for example, a light receiving element. Light α emitted from the LED of light irradiator 3 irradiates code pattern 2, and the light receiving element of light receiver 4 receives light α reflected by code pattern 2 and returned. Light receiver 4, determination part 8, and correction part 9 are electrically connected. Determination part 8 includes, for example, an electronic circuit. Determination part 8 processes a signal of light α received by the light receiving element included in light receiver 4. In addition, correction part 9 includes, for example, an electronic circuit. Correction part 9 processes a signal from determination part 8.

First Exemplary Embodiment

Figure 2:
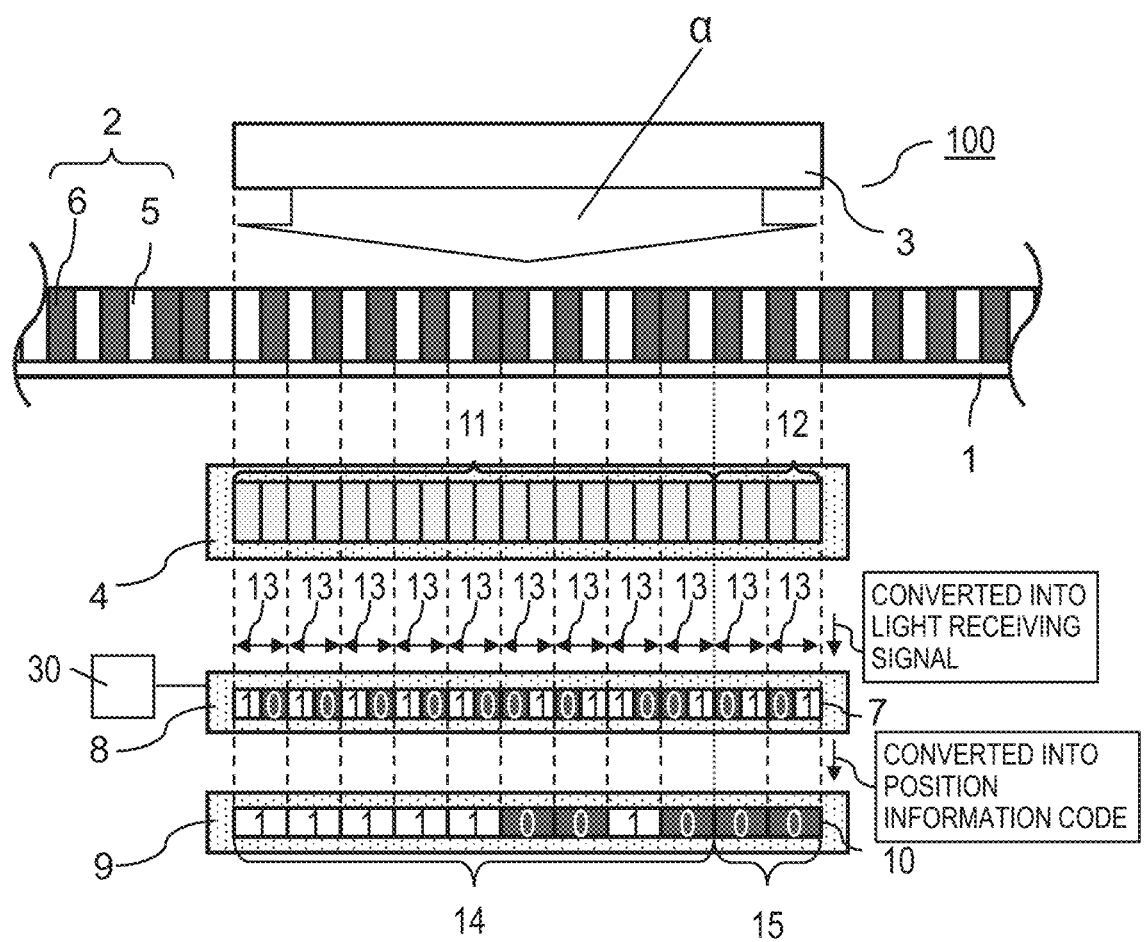
FIG. 2 is a diagram illustrating the configuration of the main part of the optical encoder according to the first exemplary embodiment.
Figure 3:
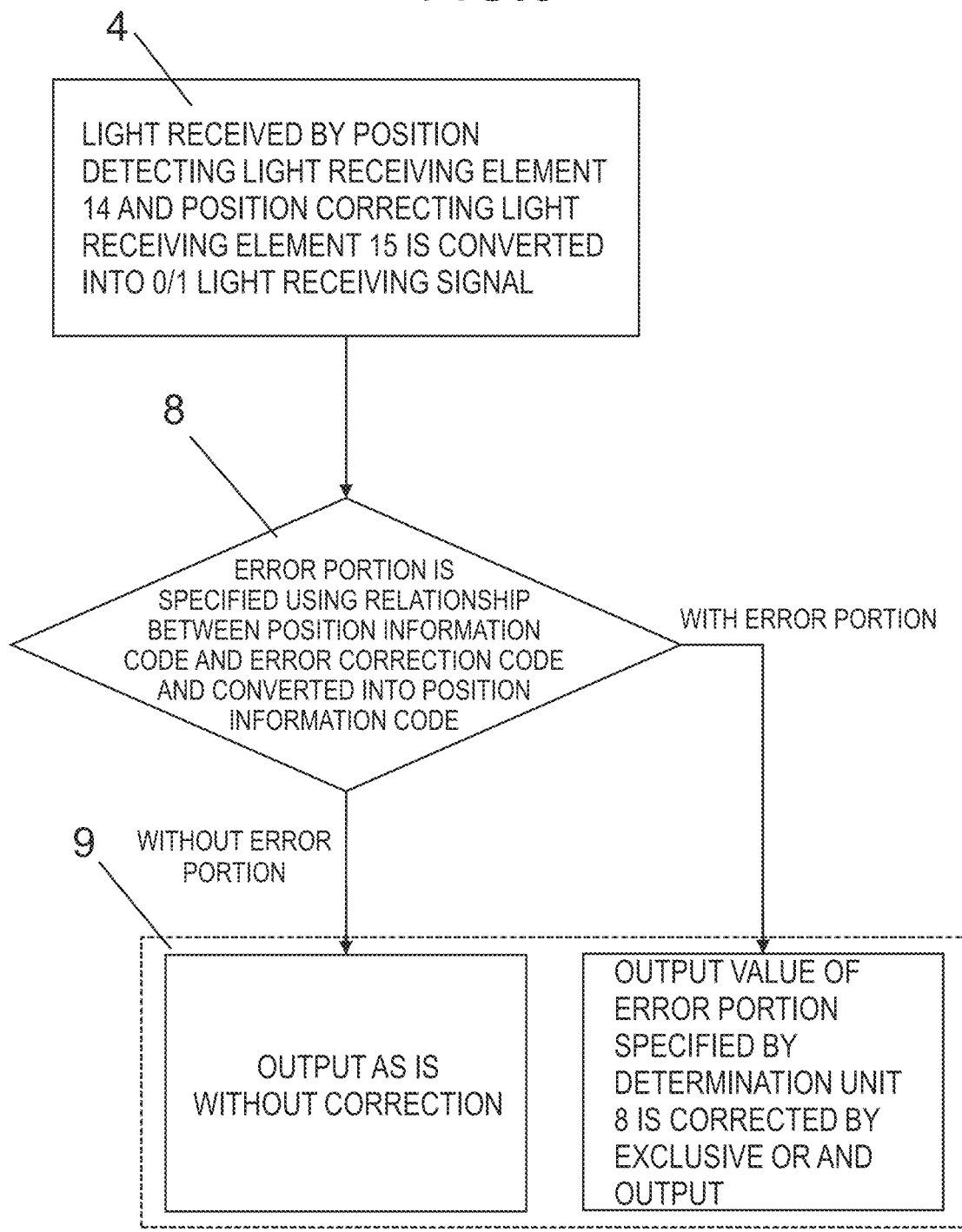
FIG. 3 is a flowchart for explaining a processing process of determining and correcting an error portion of a signal from the optical encoder according to the first exemplary embodiment.
Figure 4:
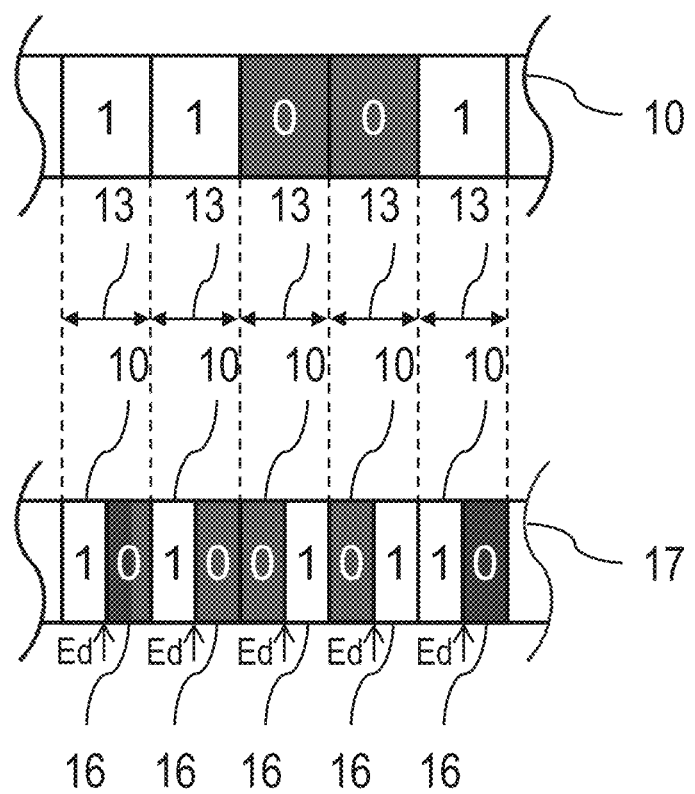
FIG. 4 is a diagram illustrating the operation principle of the optical encoder according to the first exemplary embodiment.

FIG. 2 is a diagram illustrating the configuration of the main part of optical encoder 100 according to the first exemplary embodiment. The configuration of optical encoder 100 will be described with reference to FIGS. 1 and 2. FIG. 3 is a view for explaining a processing process of determining and correcting an error portion of a signal from optical encoder 100 according to the first exemplary embodiment. A processing process up to a correction of the error portion of optical encoder 100 will be described with reference to FIG. 3. FIG. 4 is a view for explaining the operation principle of optical encoder 100 according to the first exemplary embodiment, that is, coding in which error correction code 16 is inserted into position information code 10 by Manchester coding.

Optical encoder 100 includes rotating plate 1, light irradiator 3, light receiver 4, determination part 8, and correction part 9.

Rotating plate 1 is provided with code pattern 2 indicating the position information of rotating plate 1.

Code pattern 2 includes light guider 5 that guides light α emitted from light irradiator 3 to light receiver 4, and non-light guider 6 that shields against light α emitted from light irradiator 3. Code pattern 2 is a pattern array in which an M-sequence code is pseudo-randomly coded in order that light guider 5 and non-light guider 6 indicate position information.

In the first exemplary embodiment, code pattern 2 is a pattern array in which an M-sequence code representing position information in nine patterns is pseudo-randomly coded into Manchester code 17. Hereinafter, pseudo-random coding of an M-sequence code representing position information into Manchester code 17 is referred to as "Manchester coding".

In the first exemplary embodiment, a description is made with reference to position information code 10, which is an M-sequence code, and a code obtained by Manchester coding of the M-sequence code, but other types of random coding may be used. A code representing position information is not limited to an M-sequence code and may be a code other than the M-sequence code as long as the code has position information. Like Manchester coding, pseudo-random coding encodes a code having regularity by inserting the code into a code having position information. When Manchester coding is performed, code pattern 2 becomes a pattern array into which error correction code 16 is inserted. Conventionally, in order to eliminate the ambiguity of a position, two-lane code pattern 2 is provided on rotating plate 1. However, inserting error correction code 16 by Manchester coding makes it sufficient to provide only one-lane code pattern 2, leading to the downsizing of rotating plate 1.

Light receiver 4 includes 18 position detecting light receiving elements 11 for outputting position information of rotating plate 1 and four position correcting light receiving elements 12 for outputting information for correcting an incorrect position. Conventionally, in a case of an M-sequence code expressing a one-period position with 9 bits, a light receiver is constituted by only 18 light receiving elements. In addition, in order to eliminate the ambiguity of a position, conventionally, light receiving elements are prepared in a pattern of two rows. However, for example, if Manchester coding is performed, edge Ed can be detected, and thus the configuration of one row is sufficient. Note that edge Ed (edge signal) is effective for detecting an error portion. In the present exemplary embodiment, a description is made with reference to the configuration of 18 position detecting light receiving elements 11 and four position correcting light receiving elements 12 for outputting information for correcting an incorrect position, but the number of light receiving elements of each type is not limited. Light receiver 4 converts the light guided to each light receiving element via code pattern 2 into light receiving signal 7 binarized with "0" or "1".

Determination part 8 compares position information code 10 and error correction code 16 in each code period 13 in converted light receiving signal 7 and determines whether there is no error in converted light receiving signal 7 by using a contradictory relationship to be described later. If there is an error in light receiving signal 7, the error is specified. Determination part 8 converts Manchester code 17 into position information code 10 based on the output value of light receiving signal 7 and calculates an output value as position information sequence 14 and correction information sequence 15 of rotating plate 1. Note that arithmetic processing device 30 (arithmetic processor) is connected to determination part 8. Arithmetic processing device 30 is a device that determines whether there is no error in converted light receiving signal 7 by using the following contradictory relationship.

Correction part 9 corrects the output value determined to be erroneous by determination part 8 by an exclusive logical operation.

Means for outputting position information code 10 will be described next with reference to FIGS. 2 and 3.

Light α emitted from light irradiator 3 is applied to rotating plate 1. Light α irradiates code pattern 2 on rotating plate 1. Light α emitted from code pattern 2 is reflected by light guider 5 of code pattern 2 and enters light receiver 4.

In light receiver 4, light α received by position detecting light receiving element 11 and position correcting light receiving element 12 is converted into a 0/1 light receiving signal 7.

Determination part 8 determines whether light receiving signal 7 has an error. Specifically, an error portion of converted light receiving signal 7 is specified by using the contradictory relationship between position information code 10 and error correction code 16 in each code period 13 of light receiving signal 7. The conflicting relationship will be described later. Then, light receiving signal 7 is converted into position information code 10.

If there is no error portion in light receiving signal 7, position information code 10 is output as it is without being corrected by correction part 9. If there is an error portion, correction part 9 corrects, by exclusive OR, the output value of position information code 10 obtained by converting the error portion of light receiving signal 7 specified by determination part 8 and outputs the corrected output value. The correction to be performed when there is an error portion will be described later.

In the case where no foreign substance is mixed in code pattern 2, position information code 10 obtained by correction part 9 includes one of the code values "1" and "0" in every code period 13 and is a code corresponding to the position information code of code pattern 2.

The operation principle of optical encoder 100 according to the first exemplary embodiment, that is, coding in which error correction code 16 is inserted in position information code 10 by Manchester coding will be described next with reference to FIG. 4. This operation principle is the principle of the operation performed by determination part 8.

Error correction code 16 is a code that assists determination as to whether erroneous detection due to a foreign substance has occurred in code period 13 by comparing with position information code 10 in each code period 13. The code value changes according to position information code 10 in each code period 13. When the code value corresponding to light guider 5 of position information code 10 is set to "1" and the code value corresponding to non-light guider 6 is set to "0", error correction code 16 is inserted by Manchester coding such that the code value corresponding to light guider 5 becomes "10" and the code value corresponding to non-light guider 6 becomes "01". At this time, in code period 13, inserted error correction code 16 and adjacent position information code 10 establish a contradictory relationship. The contradictory relationship here indicates that the code value within one cycle is not the same output values like "11" or "00". In each code period 13, edge Ed is formed between position information code 10 and error correction code 16. When position information code 10 is "1", edge Ed is detected as a signal whose output value decreases from 1 to 0 in code period 13. When position information code 10 is "0", edge Ed is detected as a signal whose output value increases from 0 to 1 in code period 13.

With this configuration, even when irradiation light is hindered due to the mixing of a foreign substance, it is possible to specify and correct an error portion in light receiving signal 7.

Figure 5A:
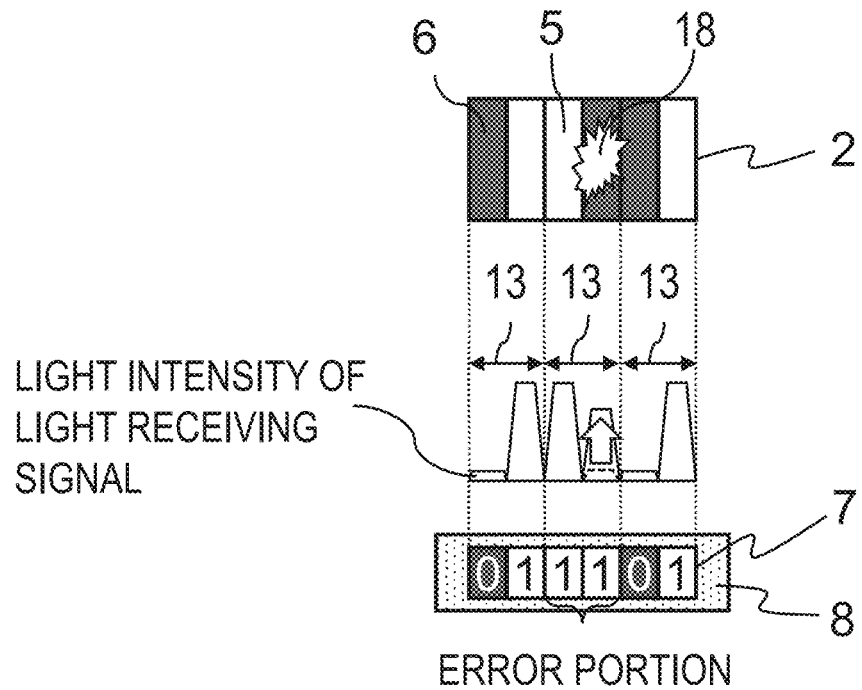
FIG. 5A is a diagram illustrating an effect of error portion detection when a foreign substance covers one portion of a code pattern in the optical encoder according to the first exemplary embodiment.
Figure 5B:
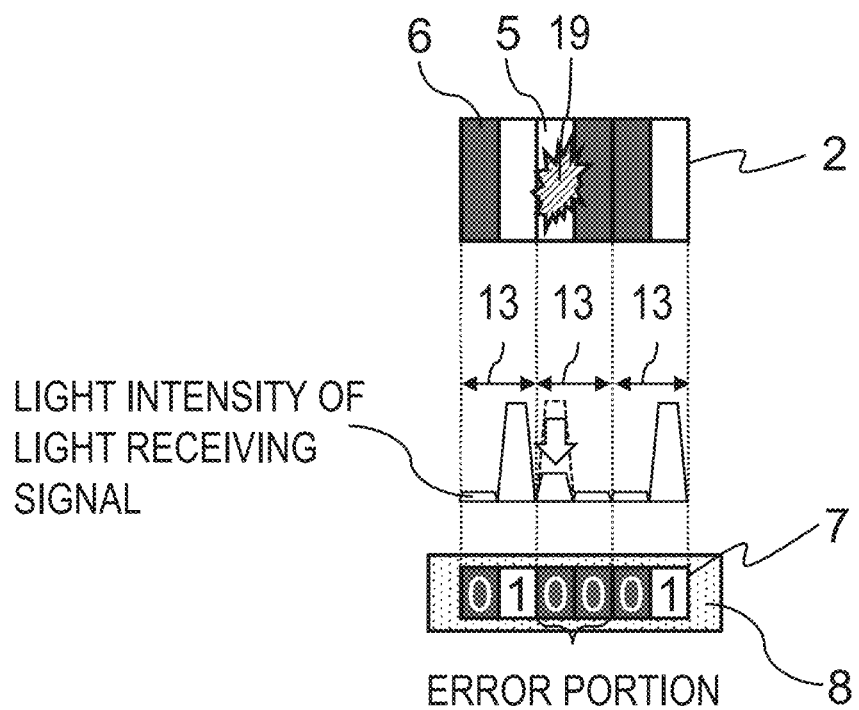
FIG. 5B is a diagram illustrating an effect of error portion detection when a foreign substance covers one portion of a code pattern in the optical encoder according to the first exemplary embodiment.

FIGS. 5A and 5B are diagrams for explaining a method of detecting an error portion when one of light guider 5 and non-light guider 6 of Manchester coded code pattern 2 is covered with a foreign substance and erroneous detection is performed in the first exemplary embodiment. FIG. 5A is a view for explaining an error detection method in determination part 8 in a case where a foreign substance serving as reflector 18 is mixed in non-light guider 6 and light is guided to light receiver 4. FIG. 5B is a view for explaining a method of detecting an error portion in determination part 8 in the case that a foreign substance serving as light shielding object 19 is mixed in light guider 5 to shield against light.

The output value of light receiving signal 7 obtained by converting light passing through light guider 5 by light receiver 4 is "1", and the output value of light receiving signal 7 obtained by converting light passing through non-light guider 6 by light receiver 4 and outputting the converted light is "0". The output value of light receiving signal 7 obtained by converting light passing through reflector 18 by light receiver 4 is "1". The output value of light receiving signal 7 obtained by converting light passing through light shielding object 19 by light receiver 4 is "0". In addition, in a case where there is no erroneous detection due to a foreign substance, in the present exemplary embodiment, since a contradictory relationship is always established within each code period 13, the output value during code period 13 is always "10" or "01".

Referring to FIG. 5A, the light amount originally supposed to be 0 is detected as a large light amount by light receiving element due to reflector 18 (see the light intensity of the light receiving signal in FIG. 5A), "0" is output as "1", and the output value in code period 13 is "11". In this state, since the two pieces of signal information deviate from the contradictory relationship, it can be determined that the two pieces of signal information are erroneous. Therefore, light receiving signal 7 in code period 13 that is output as "11" can be determined as an error (see the error portion in FIG. 5A).

Referring to FIG. 5B, a sufficient light amount cannot be detected by the light receiving element due to light shielding object 19, "1" is output as "0", and the output value in code period 13 is "00". In this state, since the two pieces of signal information deviate from the contradictory relationship, it can be determined that the two pieces of signal information are erroneous. Therefore, it is possible to determine that light receiving signal 7 in code period 13 in which "00" is output is erroneous.

In this case, the description has been made about the case where one portion of code pattern 2, which is Manchester coded, is covered with a foreign substance. However, even in a case where two or more portions of code pattern 2 are covered with foreign substances, it is possible to similarly determine error portions. Note that the determination illustrated in FIGS. 5A and 5B is performed by arithmetic processing device 30.

Figure 6A:
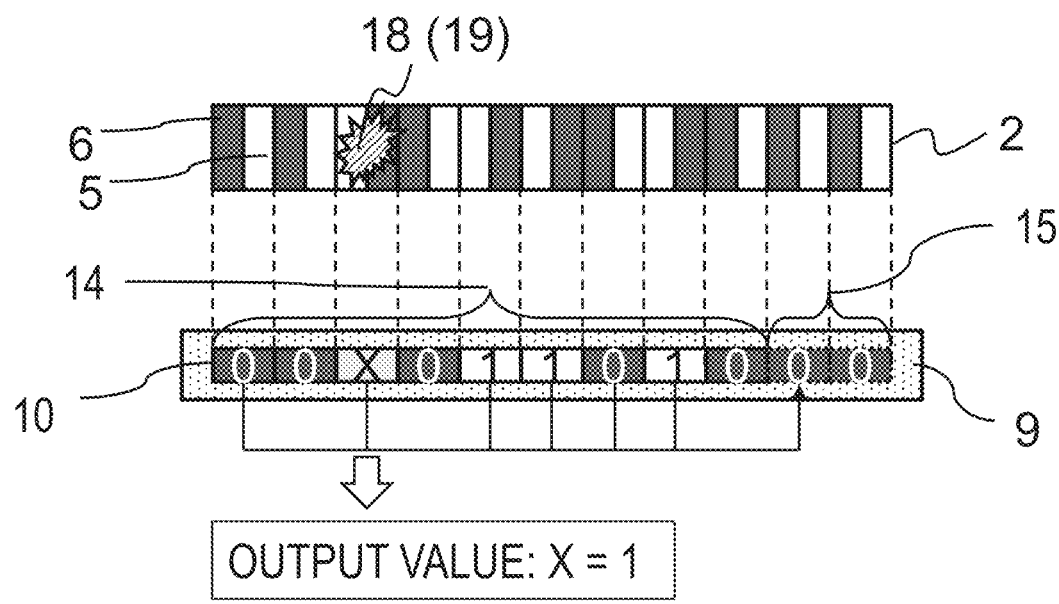
FIG. 6A is a diagram illustrating an error correction method of the optical encoder according to the first exemplary embodiment.
Figure 6B:
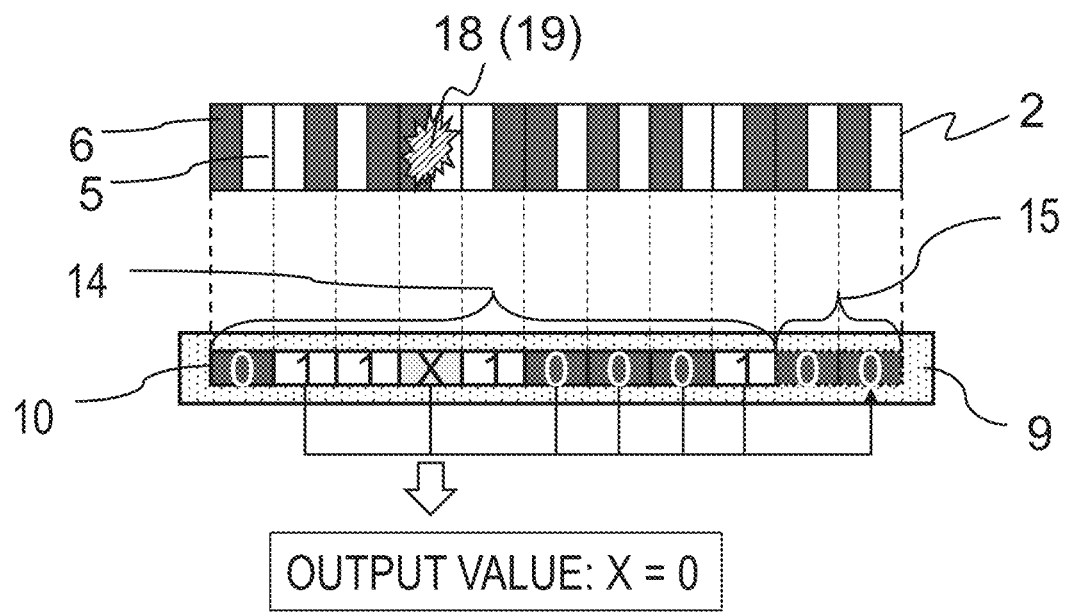
FIG. 6B is a diagram illustrating an error correction method of the optical encoder according to the first exemplary embodiment.

FIGS. 6A and 6B are diagrams for explaining an example of a correction method by correction part 9. FIG. 6A is a diagram for explaining a case of using the output value at the head of correction information sequence 15, and FIG. 6B is a diagram for explaining a case of using the output value at the second from the head of correction information sequence 15.

FIG. 6A explains a method of correcting an output value when determination part 8 determines that the output value, which is the output value at the third from the head of position information sequence 14 of code pattern 2, is incorrect.

As illustrated in FIG. 6A, correction part 9 acquires two output values output based on correction information sequence 15 in addition to the nine output values output based on position information sequence 14. The two output values output based on correction information sequence 15 are output values output from light receiver 4, similarly to the nine output values output based on position information sequence 14. The two output values output based on correction information sequence 15 are correction information for correcting at least one of the nine output values that are position information indicating the position of rotating plate 1.

In the first exemplary embodiment, the output value at the head of correction information sequence 15 is information for correcting one output value determined to be erroneous by determination part 8 among the head, the third from the head, the fifth from the head, the sixth from the head, the seventh from the head, and the eighth from the head of position information sequence 14.

A value obtained by exclusive OR of the head and the output value at the third from the head of position information sequence 14 is set as a first value. A value obtained by exclusive OR of the first value and the fifth output value from the head of position information sequence 14 is set as a second value. A value obtained by exclusive OR of the second value and the output value at the sixth from the head of position information sequence 14 is set as a third value. A value obtained by exclusive OR of the third value and the output value at the seventh from the head of position information sequence 14 is set as a fourth value. A value obtained by exclusive OR of the fourth value and the output value at the eighth from the head of position information sequence 14 is set as a fifth value. In this case, the output value at the head of correction information sequence 15 is equal to the fifth value.

For example, when the output value at the head of correction information sequence 15 is "0", the sum of the output values at the head, the third from the head, the fifth from the head, the sixth from the head, the seventh from the head, and the eighth from the head of position information sequence 14 is an even number.

In contrast to this, when the output value of correction information sequence 15 is "1", the sum of the output values at the head, the third from the head, the fifth from the head, the sixth from the head, the seventh from the head, and the eighth from the head of position information sequence 14 is an odd number.

Referring to FIG. 6A, the output value at the head of correction information sequence 15 is "0". In contrast to this, the sum of the output values at the head, the third from the head, the fifth from the head, the sixth from the head, the seventh from the head, and the eighth from the head of position information sequence 14 is "0"+"X"+"1"+"1"+ "0"+"1"="3+X". Since the output value at the head of correction information sequence 15 is "0", it can be seen that "3+X" is an even number, and it can be determined that "X"="1".

In this case, by using the method in FIG. 5A described above, it has already been determined that the output value at the third from the head of position information sequence 14 is incorrect. Therefore, correction part 9 outputs the output value at the third from the head as "1" among the output values at the head, the third from the head, the fifth from the head, the sixth from the head, the seventh from the head, and the eighth from the head of position information sequence 14.

FIG. 6B explains a method of correcting an output value when determination part 8 determines that the output value, which is the output value at the fourth from the head of position information sequence 14, is incorrect.

As illustrated in FIG. 6B, as in the case shown in FIG. 6A, correction part 9 acquires two output values output based on correction information sequence 15 in addition to the nine output values output based on position information sequence 14.

In the first exemplary embodiment, the output value at the second from the head of the sequence of correction information sequence 15 is information for correcting one output value determined by determination part 8 to be possibly erroneous among the output values output based on the second from the head, the fourth from the head, the sixth from the head, the seventh from the head, the eighth from the head, and the ninth from the head of position information sequence 14.

A value obtained by exclusive OR of the output values at the second from the head and the fourth from the head of position information sequence 14 is set as a sixth value. A value obtained by exclusive OR of the sixth value and the output value at the sixth from the head of position information sequence 14 is set as a seventh value. A value obtained by exclusive OR of the seventh value and the output value at the seventh from the head of position information sequence 14 is set as an eighth value. A value obtained by exclusive OR of the eighth value and the output value at the eighth from the head of position information sequence 14 is set as a ninth value. A value obtained by exclusive OR of the ninth value and the output value at the ninth from the head of position information sequence 14 is set as a 10th value. In this case, the output value at the second from the head of correction information sequence 15 is equal to the 10th value.

For example, when the output value at the second from the head of correction information sequence 15 is "0", the sum of the output values output based on each of the output values at the second from the head, the fourth from the head, the sixth from the head, the seventh from the head, the eighth from the head, and the ninth from the head of position information sequence 14 is an even number.

In contrast to this, when the output value at the second from the head of position information sequence 14 is "1", the sum of the output values output based on each of the output values at the second from the head, the fourth from the head, the sixth from the head, the seventh from the head, the eighth from the head, and the ninth from the head of the first sequence is an odd number.

Referring to FIG. 6B, the output value at the second from the head of correction information sequence 15 is "0". In contrast to this, the sum of the output values at the second from the head, the fourth from the head, the sixth from the head, the seventh from the head, the eighth from the head, and the ninth of position information sequence 14 is "1"+"X"+"0"+"0"+"0"+"1"="2+X". Since the output value at the head of correction information sequence 15 is "0", it can be seen that "2+X" is an even number, and it can be determined that "X"="0". In this case, by using FIG. 5B described above, it has already been determined that the output value at the fourth from the head of position information sequence 14 is incorrect. Therefore, correction part 9 outputs the output value at the fourth from the head as "0" among the output values at the second from the head, the fourth from the head, the sixth from the head, the seventh from the head, the eighth from the head, and the ninth from the head of position information sequence 14.

Second Exemplary Embodiment

The first exemplary embodiment has exemplified the configuration in which error correction code 16 is inserted into position information code 10 and Manchester coding is performed on code pattern 2 on rotating plate 1. However, code pattern 2 may be configured not by Manchester coding but by pseudo-random coding using differential Manchester code 20 illustrated in FIG. 7, for example. Pseudo-random coding using differential Manchester code 20 is hereinafter referred to as "differential Manchester coding".

Optical encoder 200 according to the second exemplary embodiment has the same basic configuration as that of the first exemplary embodiment and differs only in code pattern 2 and the determination method by determination part 8. Other constituent parts and processing processes are similar to those of the first exemplary embodiment, and thus a description thereof will be omitted.

Figure 7:
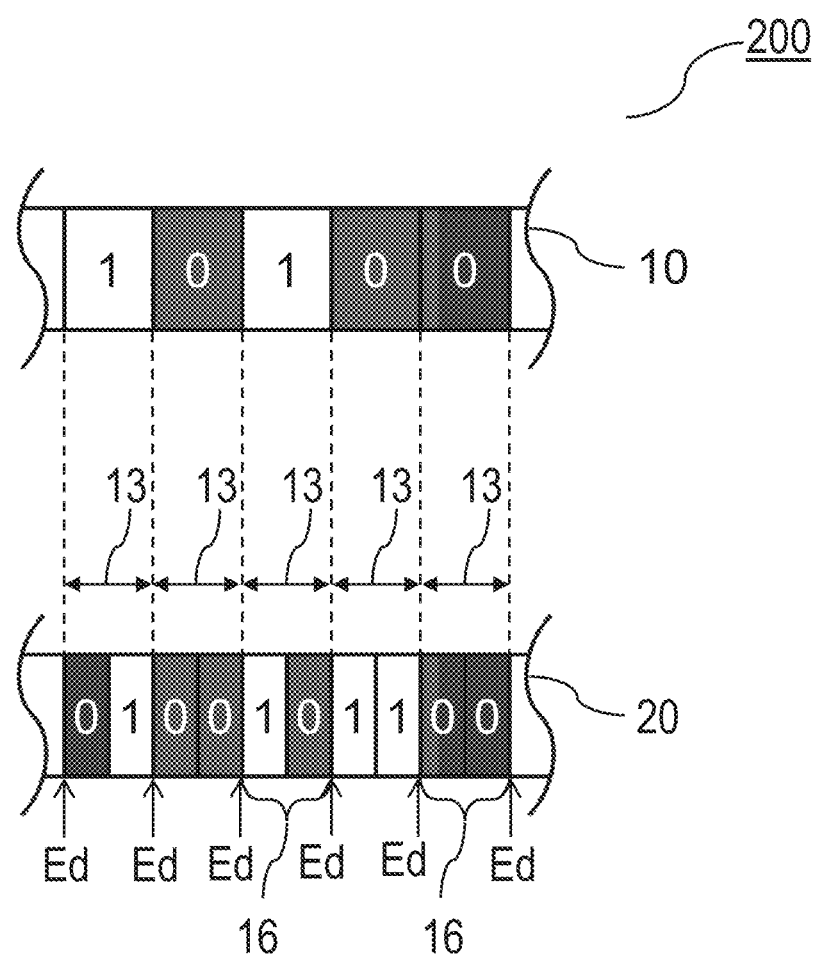
FIG. 7 is a diagram illustrating the operation principle of the optical encoder according to the second exemplary embodiment.

FIG. 7 is a diagram for explaining the operation principle of an optical encoder according to the second exemplary embodiment, that is, a diagram for explaining a state in which code pattern 2 is subjected to differential Manchester coding (pseudo-random coding is performed by differential Manchester code 20). Differential Manchester coding has the following two features. One is that the code value always transitions from "0" to "1" or from "1" to "0" every time code period 13 advances by one period. That is, it changes from "1" to "0" or from "0" to "1" across the boundary between adjacent periods. The other is that when the code value of position information code 10 which is the original code is "1", the code value transitions to "10" or "01" in the middle of code period 13 by differential Manchester coding. In contrast to this, when the code value of position information code 10 is "0", the code value becomes "11" or "00" in the middle of code period 13 by differential Manchester coding. That is, even if the code value of position information code 10 is continuous as the same value, the same output value does not continuously transition. For example, even if the code value of position information code 10 is continuous like "0" and "0", the differential Manchester coded output value is not continuous like, for example, "11" and "11". According to the second feature, as described above in the present exemplary embodiment, differential Manchester coding is established even in a case where the conditions for "0" and "1" are opposite. According to the above two features, two code periods 13 output as "10" and "00", which are adjacent to code period 13 output as "11" in FIG. 7, act as error correction codes 16. The above-described relationship in which two code periods 13 adjacent to given code period 13 act as error correction codes 16 is similarly established between all differential Manchester coded code patterns 2. Note that, since the code value changes from "1" to "0" or from "0" to "1" across the boundary between adjacent periods, a change in signal at the boundary between the adjacent periods can be used as an edge signal. Referring to FIG. 7, the edge signal is referred to as edge Ed.

FIGS. 8A and 8B are diagrams for explaining a method of detecting an error portion when one of light guider 5 and non-light guider 6 of differential Manchester coded code pattern 2 is covered with a foreign substance and erroneous detection is performed in the second exemplary embodiment. FIG. 8A is a view for explaining an error detection method in determination part 8 in a case where a foreign substance serving as reflector 18 is mixed in non-light guider 6 and light is guided to light receiver 4. FIG. 8B is a view for explaining a method of detecting an error portion in determination part 8 in the case that a foreign substance serving as light shielding object 19 is mixed in light guider 5 to shield against light.

Referring to FIG. 8A, the light amount originally supposed to be 0 is detected as a large light amount by light receiving element due to reflector 18 (see the light intensity of the light receiving signal in FIG. 8A), "0" is output as "1", and the output value in code period 13 is "01". In this state, the output value of adjacent code period 13 is "11", and the transition of the code value accompanying the change of code period 13 is not observed. Therefore, one or both of light receiving signals 7 in code period 13 which have output "01" and "11" adjacent thereto can be determined as an error or errors (see the error portion in FIG. 8A).

Referring to FIG. 8B, a sufficient light amount cannot be detected by the light receiving element due to light shielding object 19 (see the light intensity of the receiving signal in FIG. 8B), "1" is output as "0", and the output value in code period 13 is "00". In this state, the output value of adjacent code period 13 is "10", and the transition of the code value accompanying the change of code period 13 is not observed. Therefore, one or both of light receiving signals 7 in code period 13 which have output "10" and "00" adjacent thereto can be determined as an error or errors (see the error portion in FIG. 8B).

In this case, the description has been made about the case where one portion of code pattern 2 is covered with a foreign substance. However, even in a case where two or more portions of code pattern 2 are covered with foreign substances, it is possible to similarly determine error portions.

Figure 9:
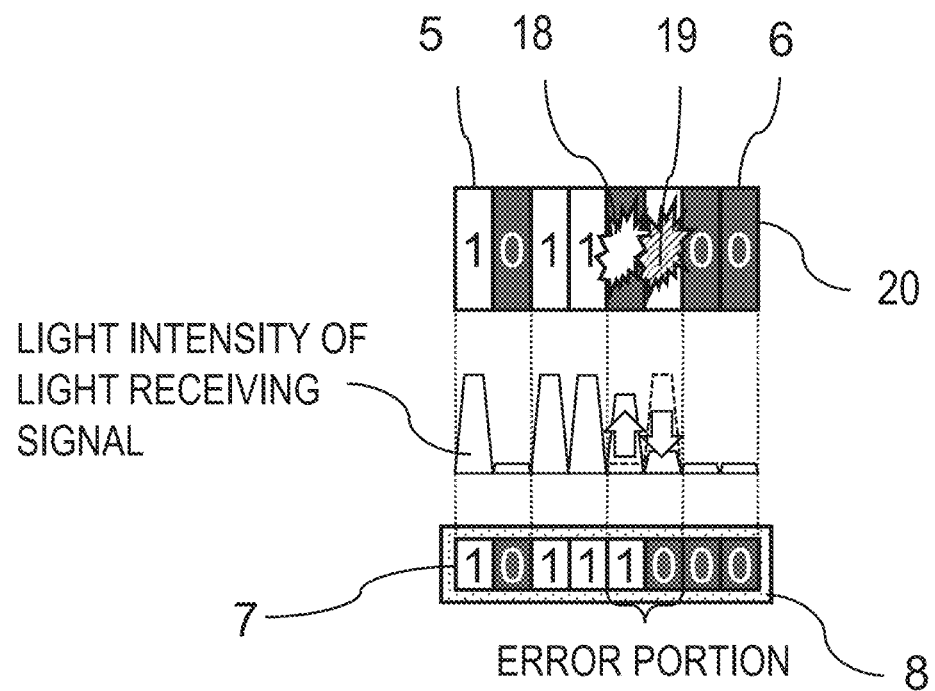
FIG. 9 is a diagram illustrating an effect of error portion detection when different types foreign substances cover two consecutive portions of a code pattern in the optical encoder according to the second exemplary embodiment.

FIG. 9 is a view for explaining a method of detecting an error portion in a case where reflector 18 and light shielding object 19 are respectively mixed into non-light guider 6 and light guider 5 during code period 13 arranged in the order of non-light guider 6 and light guider 5, the amount of light detected by the light receiving element (see the light intensity of a light receiving signal in FIG. 9) is changed, and an output value in code period 13 is inverted in the second exemplary embodiment.

The output value during code period 13 that is originally "01" is inverted to "10" by reflector 18 and light shielding object 19, and the output values in three consecutive code periods 13 become "111000". Therefore, the transition of the code value accompanying the change of code period 13 is not observed between code period 13 in which "11" is output and code period 13 in which "10" is output. Therefore, one or both of light receiving signals 7 in code period 13 in which "11" is output and in adjacent code period 13 in which "10" is output can be determined as an error or errors (see the error portion in FIG. 9). Note that the determination illustrated in FIG. 9 is performed by arithmetic processing device 30.

In addition, determination part 8 performs conversion to position information code 10 based on the output value of light receiving signal 7 and outputs the resultant values as position information sequence 14 and correction information sequence 15 of rotating plate 1.

If determination part 8 can identify an error portion, the error portion is corrected by the method described in the first exemplary embodiment.

Third Exemplary Embodiment

The above exemplary embodiments have exemplified the method of error detection using an edge signal. The third and subsequent exemplary embodiments will exemplify a method of specifying an error portion without using any edge signal.

The first exemplary embodiment has exemplified the configuration in which one error correction code 16 is inserted every other position information code 10 by Manchester coding of code pattern 2 on rotating plate 1. The above-described configuration may be a configuration in which two error correction codes 16 are inserted every two position information codes 10.

Optical encoder 300 according to the third exemplary embodiment has the same basic configuration as that of the first exemplary embodiment and differs only in code pattern 2 and the determination method by determination part 8. Other constituent parts and processing processes are similar to those of the first exemplary embodiment, and thus a description thereof will be omitted.

Figure 10:
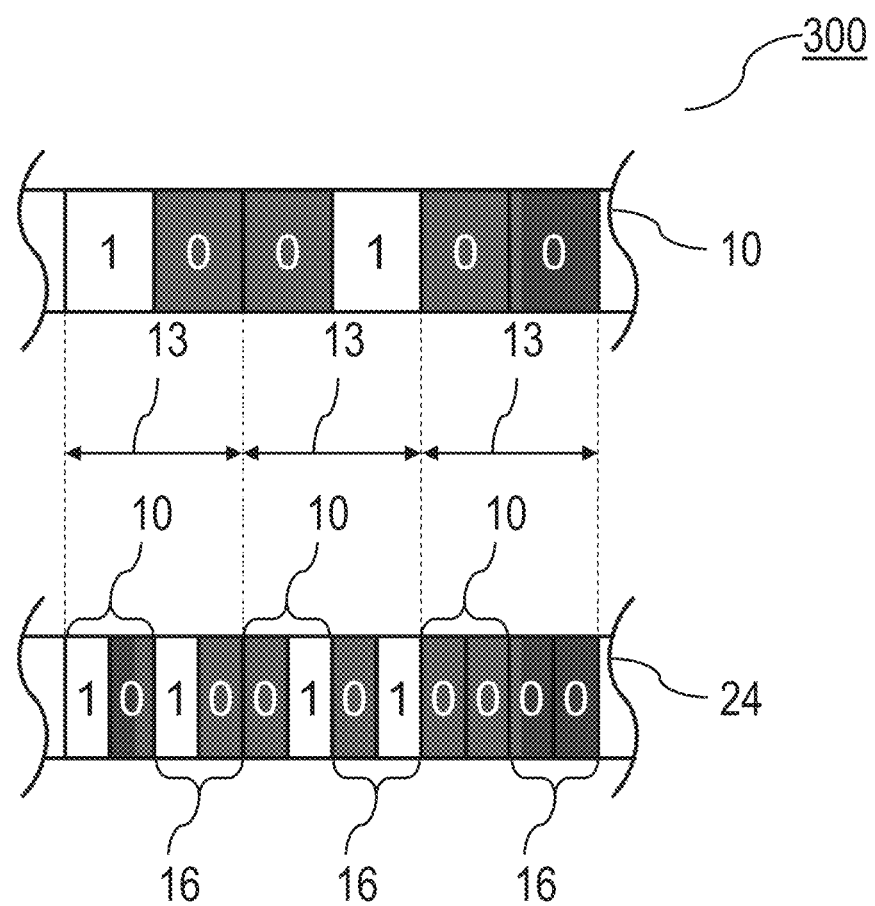
FIG. 10 is a diagram illustrating the operation principle of an optical encoder according to the third exemplary embodiment.

FIG. 10 is a diagram illustrating the operation principle of optical encoder 300 according to the third exemplary embodiment, that is, a diagram illustrating coding in which two error correction codes 16 are inserted every two position information codes 10 (see repetitive code 24 in FIG. 10). In this case, coding is performed such that codes having the same output value as those of two consecutive position information codes 10 before conversion are inserted as error correction codes 16, and a total of four codes obtained by combining two consecutive position information codes 10 and two error correction codes 16 are set as one code period 13. That is, in the third exemplary embodiment, the code period is twice as long as that in the first exemplary embodiment. Repetitive code 24 corresponds to code pattern 2.

In the coding described above, inserted error correction code 16 and adjacent position information code 10 in code period 13 have a repetitive relationship. The repetitive relationship described herein indicates that position information code 10 and error correction code 16 repeat the same output values such as "0000", "1010", "0101", and "1111" within each code period 13. Since only the above-described four types of code patterns are output, position information can be calculated by recognizing the above-described four types of code patterns.

Figure 11A:
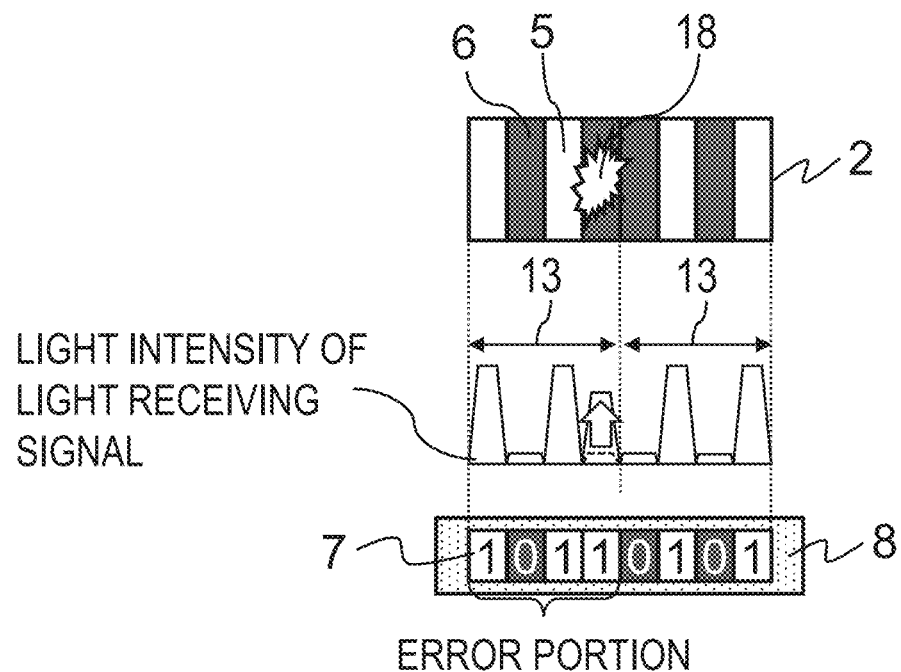
FIG. 11A is a diagram illustrating an effect of error portion detection when a foreign substance covers one portion of a code pattern in the optical encoder according to the third exemplary embodiment.
Figure 11B:
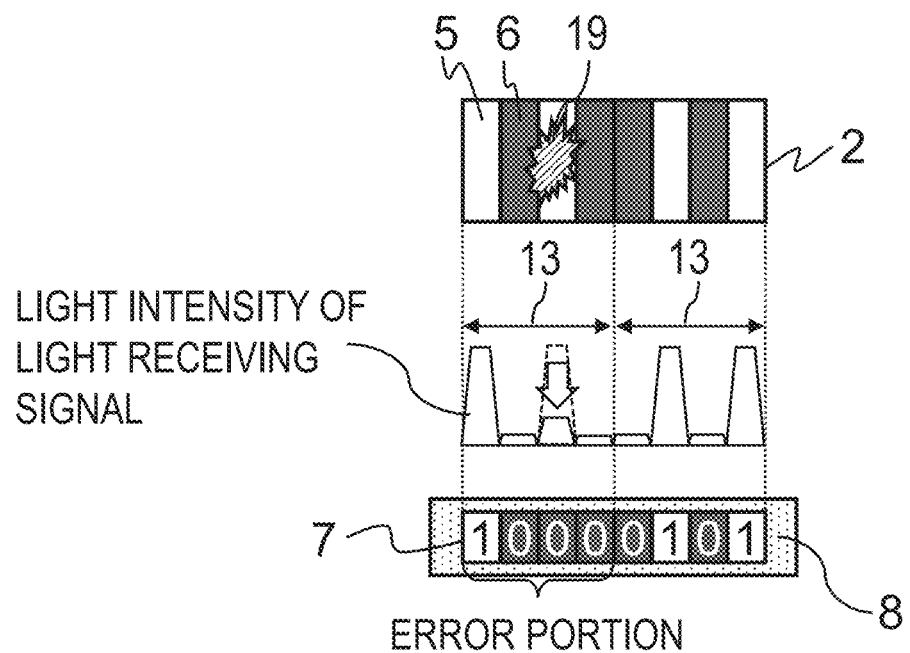
FIG. 11B is a diagram illustrating an effect of error portion detection when a foreign substance covers one portion of a code pattern in the optical encoder according to the third exemplary embodiment.

FIGS. 11A and 11B are diagrams for explaining a method of detecting an error portion when one of light guider 5 and non-light guider 6 is covered with a foreign substance and erroneous detection is performed in the third exemplary embodiment. FIG. 11A is a view for explaining an error detection method in determination part 8 in a case where a foreign substance serving as reflector 18 is mixed in non-light guider 6 and light is guided to light receiver 4. FIG. 11B is a view for explaining a method of detecting an error portion in determination part 8 in the case that a foreign substance serving as light shielding object 19 is mixed in light guider 5 to shield against light.

When there is no erroneous detection due to a foreign substance, a repetitive relationship is always established in each code period 13, and thus the output value in each code period 13 is always either "0000", "1010", "0101", or "1111".

Referring to FIG. 11A, the light amount originally supposed to be 0 is detected as a large light amount by light receiving element due to reflector 18 (see the light intensity of the light receiving signal in FIG. 11A), "0" is output as "1", and the output value in code period 13 is "1011". In this state, since the four pieces of signal information deviate from the repetitive relationship, it can be determined that the four pieces of signal information are erroneous. Therefore, light receiving signal 7 in code period 13 that is output as "1011" can be determined as an error (see the error portion in FIG. 11A). Note that the determination illustrated in FIGS. 11A and 11B is performed by arithmetic processing device 30.

Referring to FIG. 11B, a sufficient light amount cannot be detected by the light receiving element due to light shielding object 19 (see the light intensity of the receiving signal in FIG. 11B), "1" is output as "0", and the output value in code period 13 is "1000". In this state, since the two pieces of signal information deviate from the repetitive relationship, it can be determined that the two pieces of signal information are erroneous (see the error portion in FIG. 11B). Therefore, it is possible to determine that light receiving signal 7 in code period 13 in which "1000" is output is erroneous.

In this case, the description has been made about the case where one portion of code pattern 2 is covered with a foreign substance. However, even in a case where two or more portions of code pattern 2 are covered with foreign substances, it is possible to similarly determine error portions.

In addition, determination part 8 performs conversion to position information code 10 based on the output value of light receiving signal 7 and outputs the resultant values as position information sequence 14 and correction information sequence 15 of rotating plate 1.

If determination part 8 can identify an error portion, the error portion is corrected by the method described in the first exemplary embodiment.

Fourth Exemplary Embodiment

The third exemplary embodiment has exemplified the configuration in which two error correction codes 16 are inserted every two position information codes 10. However, a configuration in which one error correction code 16 is inserted every two position information codes 10 may be used.

Optical encoder 400 according to the fourth exemplary embodiment has the same basic configuration as that of the first exemplary embodiment and differs only in code pattern 2 and the determination method by determination part 8. Other constituent parts and processing processes are similar to those of the first exemplary embodiment, and thus a description thereof will be omitted.

Figure 12:
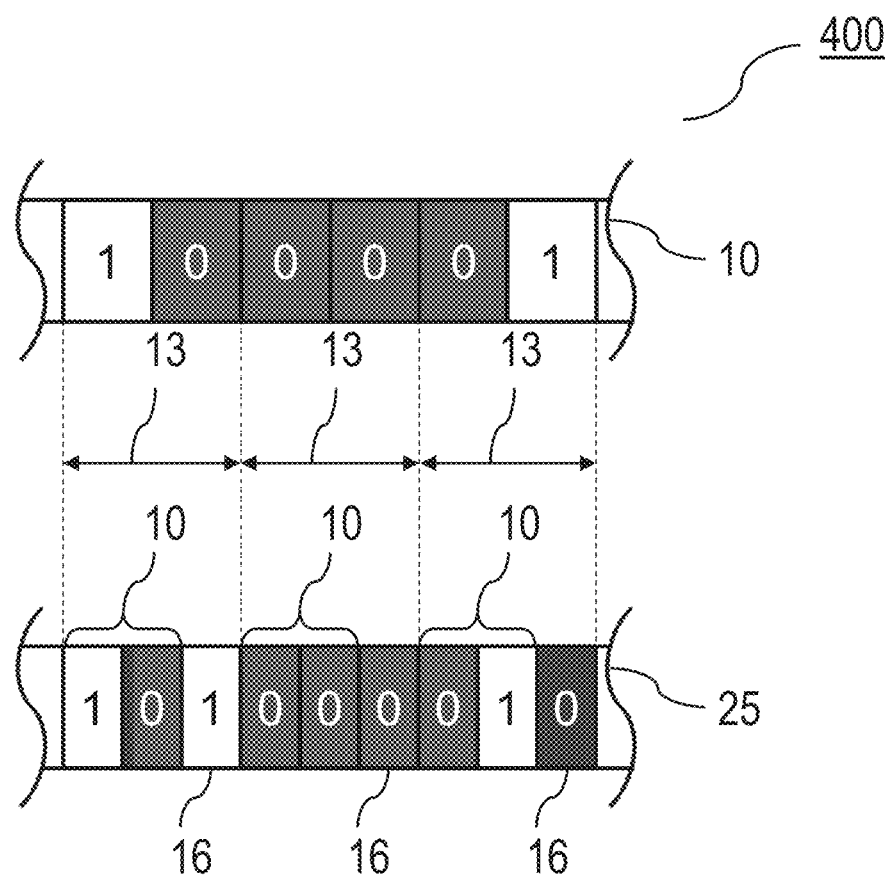
FIG. 12 is a diagram illustrating the operation principle of an optical encoder according to the fourth exemplary embodiment.

FIG. 12 is a diagram for explaining the operation principle of optical encoder 400 according to the fourth exemplary embodiment, that is, a diagram illustrating coding in which one error correction code 16 is inserted every two position information codes 10 (see repetitive code 25 after the conversion in FIG. 12). In this case, one error correction code 16 that outputs a value corresponding to values output from two consecutive position information codes 10 before conversion is inserted. This is coding in which three codes obtained by combining two consecutive position information codes 10 and one error correction code 16 are set as one code period 13. Repetitive code 25 corresponds to code pattern 2.

Inserted error correction code 16 and two position information codes 10 establish a correspondence relationship within each code period 13. In this correspondence relationship, "1" is inserted as error correction code 16 when position information code 10 is "11" or "10". When position information code 10 is "01" or "00", "0" is inserted as error correction code 16. Therefore, within each code period 13, position information code 10 and error correction code 16 always indicate any output value of "111", "101", "010", and "000". Since only the above-described four types of code patterns are output, position information can be calculated by recognizing the above-described four types of code patterns.

Figure 13A:
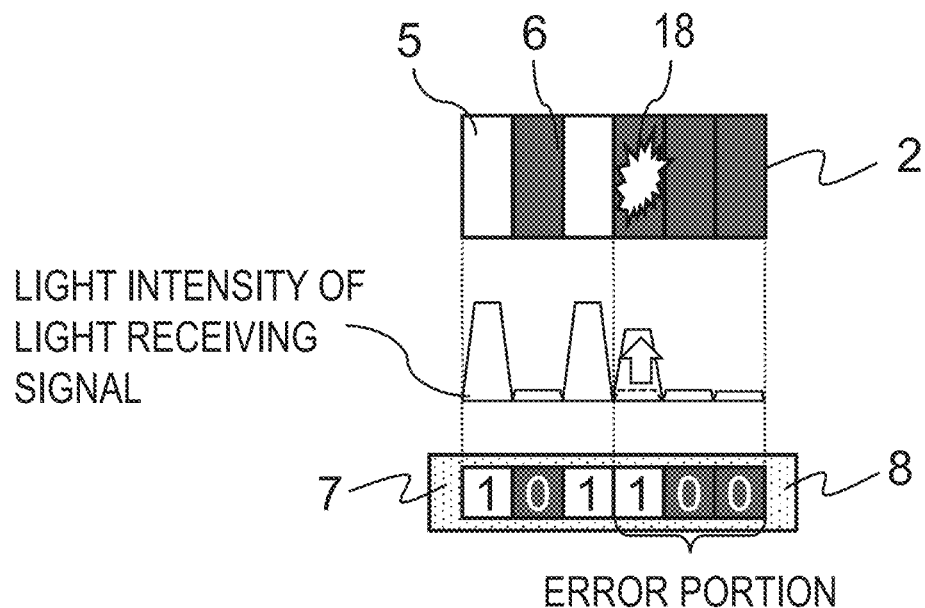
FIG. 13A is a diagram illustrating an effect of error portion detection when a foreign substance covers one portion of a code pattern in the optical encoder according to the fourth exemplary embodiment.
Figure 13B:
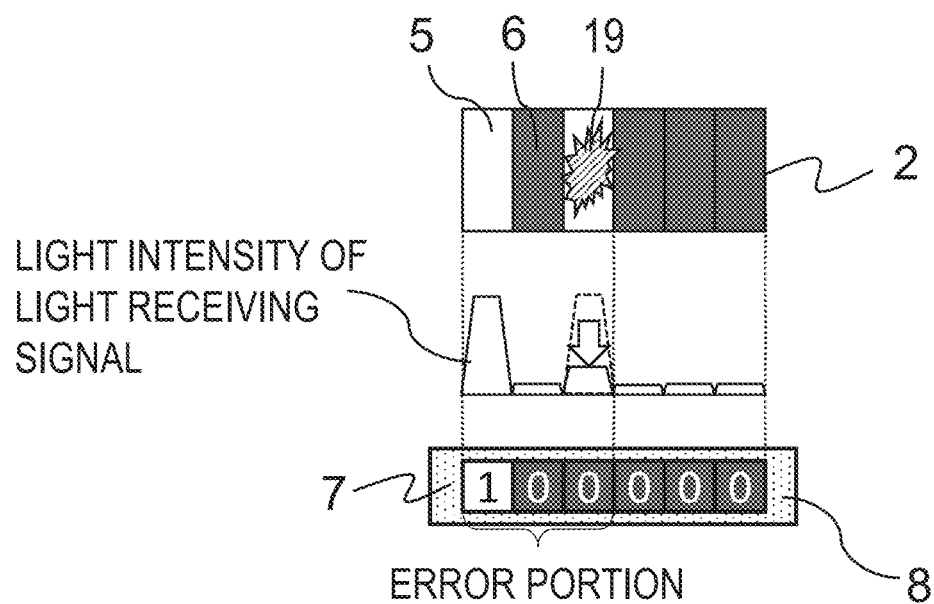
FIG. 13B is a diagram illustrating an effect of error portion detection when a foreign substance covers one portion of a code pattern in the optical encoder according to the fourth exemplary embodiment.

FIGS. 13A and 13B are diagrams for explaining a method of detecting an error portion when one of light guider 5 and non-light guider 6 is covered with a foreign substance and erroneous detection is performed in the fourth exemplary embodiment. FIG. 13A is a view for explaining an error detection method in a case where a foreign substance serving as reflector 18 is mixed in non-light guider 6 and light is guided to light receiver 4. FIG. 13B is a view for explaining a method of detecting an error portion in determination part 8 in the case that a foreign substance serving as light shielding object 19 is mixed in light guider 5 to shield against light.

When there is no erroneous detection due to a foreign substance, a correspondence relationship is always established in each code period 13, and thus the output value in each code period 13 is always either "111", "101", "010", or "000".

Referring to FIG. 13A, the light amount originally supposed to be 0 is detected as a large light amount by light receiving element due to reflector 18 (see the light intensity of the light receiving signal in FIG. 13A), "0" is output as "1", and the output value in code period 13 is "100". In this state, since the three pieces of signal information deviate from the correspondence relationship, it can be determined that the three pieces of signal information are erroneous. Therefore, light receiving signal 7 in code period 13 that is output as "100" can be determined as an error (see the error portion in FIG. 13A).

Referring to FIG. 13B, a sufficient light amount cannot be detected by the light receiving element due to light shielding object 19 (see the light intensity of the receiving signal in FIG. 13B), "1" is output as "0", and the output value during code period 13 is "100". In this state, since the three pieces of signal information deviate from the contradictory relationship, it can be determined that the three pieces of signal information are erroneous. Therefore, light receiving signal 7 in code period 13 that is output as "100" can be determined as an error (see the error portion in FIG. 13B). Note that the determination illustrated in FIGS. 13A and 13B is performed by arithmetic processing device 30.

In this case, the description has been made about the case where one portion of code pattern 2 is covered with a foreign substance. However, even in a case where two or more portions of code pattern 2 are covered with foreign substances, it is possible to similarly determine error portions.

In addition, determination part 8 performs conversion to position information code 10 based on the output value of light receiving signal 7 and outputs the resultant values as position information sequence 14 and correction information sequence 15 of rotating plate 1.

If determination part 8 can identify an error portion, the error portion is corrected by the method described in the first exemplary embodiment.

The first exemplary embodiment has exemplified the configuration in which one error correction code 16 is inserted into one position information code 10. The third exemplary embodiment has exemplified the configuration in which two error correction codes 16 are inserted into two position information codes 10. The fourth exemplary embodiment has exemplified the configuration in which one error correction code 16 is inserted into two position information codes 10. The number of position information codes 10 and the number of corresponding error correction codes 16 are not limited to the above four forms. For example, the array of code pattern 2 may be an array in which Y (Y is a natural number) error correction codes 16 are inserted every X (X is a natural number) error correction codes 16 of position information code 10 in the position information data string.

Fifth Exemplary Embodiment

Light receiver 4 according to the first, second, third, and fourth exemplary embodiments includes position detecting light receiving element 11 that outputs position information and position correcting light receiving element 12 that outputs error correction information. However, the light receiver may use an image sensor such as a complementary metal oxide semiconductor (CMOS) sensor or a charge coupled device (CCD) sensor having a region for outputting position information and a region for outputting error correction information instead of light receiving elements as long as it can output position information and error correction information. In the first exemplary embodiment, the second exemplary embodiment, the third exemplary embodiment, the fourth exemplary embodiment, and the present exemplary embodiment, the present disclosure can be applied to either a reflection type or transmission type optical encoder. In the case of a transmission type optical encoder, light irradiator 3, rotating plate 1, and light receiver 4 may be disposed in a transmission type optical arrangement, and light guider 5 and non-light guider 6 may be configured as a transmissive part and a non-transmissive part, respectively. In the case of a reflection type optical encoder, light irradiator 3, rotating plate 1, and light receiver 4 may be disposed in a reflection type optical arrangement, and light guider 5 and non-light guider 6 may be configured as a reflective part and a non-reflective part, respectively. As long as a transmission type optical encoder and a reflection type optical encoder are configured with the above configuration, the material of and the method of forming each component are not limited.

Sixth Exemplary Embodiment

The first to fifth exemplary embodiments described above each have exemplified the rotary encoder. However, the present disclosure is applicable not only to the rotary encoder but also to the linear encoder illustrated in FIGS. 14A and 14B.

Figure 14A:
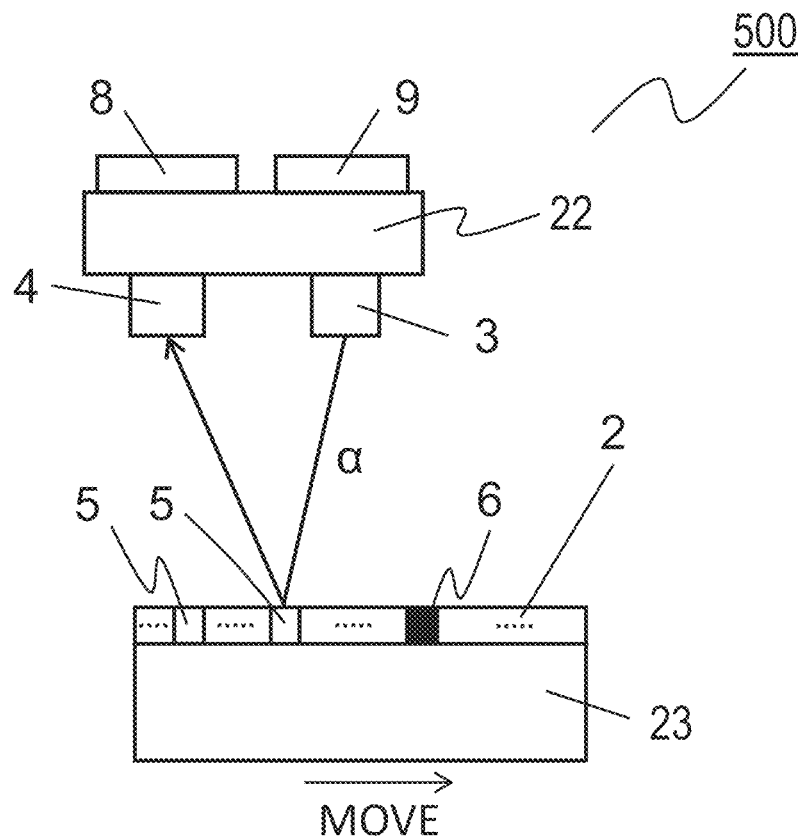
FIG. 14A is a schematic view illustrating an example of an optical encoder according to the sixth exemplary embodiment.
Figure 14B:
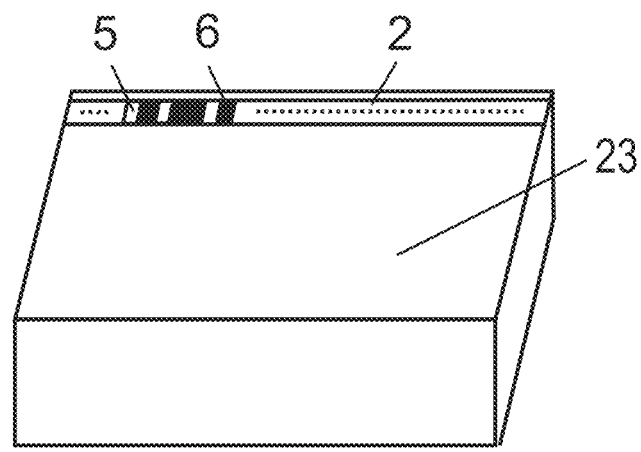
FIG. 14B is a perspective view of a moving body of the optical encoder according to the sixth exemplary embodiment.

FIG. 14A is a schematic view illustrating an example of optical encoder 500 according to the sixth exemplary embodiment. FIG. 14B is a perspective view of moving body 23 of optical encoder 500 according to the sixth exemplary embodiment. A difference from the first exemplary embodiment is that moving body 23 is applied instead of rotating body 21.

Moving body 23 moves linearly. In addition, code pattern 2 is provided on the surface of moving body 23. Code pattern 2 has a straight belt-like shape. Light irradiator 3 and light receiver 4 are provided on the main surface of fixing part 22, with the main surface facing code pattern 2. Determination part 8 and correction part 9 are provided on the surface of fixing part 22 opposite to the main surface on which light irradiator 3 and light receiver 4 are provided. Light irradiator 3 includes, for example, a light emitting diode (LED). Light receiver 4 includes, for example, a light receiving element. Light α emitted from the LED of light irradiator 3 irradiates code pattern 2, and the light receiving element of light receiver 4 receives light α reflected by code pattern 2 and returned. Light receiver 4, determination part 8, and correction part 9 are electrically connected. Determination part 8 includes, for example, an electronic circuit. Determination part 8 processes a signal of light α received by the light receiving element included in light receiver 4. In addition, correction part 9 includes, for example, an electronic circuit. Correction part 9 processes a signal from determination part 8.

The operation of optical encoder 500 according to the sixth exemplary embodiment is similar to the operation of optical encoder 100 according to the first exemplary embodiment.

Note that it is needless to say that the present exemplary embodiment can be applied to either a reflection type or a transmission type optical encoder as in the first to fifth exemplary embodiments. As long as a transmission type optical encoder and a reflection type optical encoder are configured with the above configuration, the material of and the method of forming each component are not limited.

INDUSTRIAL APPLICABILITY

The encoder according to the present disclosure can be used to detect the rotation of the rotating shaft or the like of a motor that rotationally drives a load. Furthermore, the encoder according to the present disclosure can be used to detect the position of a linearly moving object.

REFERENCE MARKS IN THE DRAWINGS

1: rotating plate
2: code pattern
3: light irradiator
4: light receiver
5: light guider
6: non-light guider
7: light receiving signal
8: determination part
9: correction part
10: position information code
11: position detecting light receiving element
12: position correcting light receiving element
13: code period
14: position information sequence
15: correction information sequence
16: error correction code
17: Manchester code
18: reflector
19: light shielding object
20: differential Manchester code
21: rotating body
22: fixing part
23: moving body
24, 25: repetitive code
30: arithmetic processing device
100, 200, 300, 400, 500: optical encoder
SH: rotating shaft

The invention claimed is:

1. An encoder comprising:
a moving plate having a code pattern that is a position information code and is also an error determination code for an adjacent code;
an irradiator configured to irradiate the code pattern with light;
a light receiver configured to receive light emitted from the irradiator and passing through the code pattern; and
a determination part configured to specify an error portion occurring in a signal derived from the code pattern based on a relationship between a signal derived from the position information code and a signal derived from the error correction code, wherein:
the determination part includes an arithmetic processor configured to perform, when the position information code and the adjacent error correction code have a correspondence relationship, an arithmetic operation using the correspondence relationship, with the error correction code being added according to a code value of the arbitrary position information code in which the code patterns are consecutive, and
the determination part specifies the error portion based on a result of the arithmetic operation.

2. The encoder according to claim 1, wherein:
the arithmetic processor is configured to perform, when the position information code and the adjacent error correction code have a correlation upon Manchester coding of the code pattern, an arithmetic operation using the correlation, and
the determination part specifies the error portion based on a result of the arithmetic operation.

3. The encoder according to claim 1, wherein:
the arithmetic processor is configured to perform, when transition of a code value occurs as a code period is switched upon differential Manchester coding of the code pattern, an arithmetic operation using the transition of the code value, and
the determination part specifies the error portion based on a result of the arithmetic operation.

4. The encoder according to claim 1, wherein the code pattern is formed on a rotating plate.

5. The encoder according to claim 1, further comprising:
a correction part configured to correct a result determined as an error by the determination part.

6. The encoder according to claim 1, wherein the array of the code pattern is an array in which the error correction code is inserted into the position information data string by Manchester coding.

7. The encoder according to claim 1, wherein the array of the code pattern is an array in which the error code is inserted into the position information data string by differential Manchester coding.

8. The encoder according to claim 1, wherein in the array of the code pattern, Y error correction codes are inserted every X position information codes of the position information data string.

9. The encoder according to claim 1, wherein the light receiver includes an image sensor including a position detection region that outputs position information of the code pattern and a position correction region that outputs information for correcting an error.

10. The encoder according to claim 1, wherein the code pattern includes a light guider configured to guide the light emitted from the light irradiator to the light receiver and a non-light guider configured to not guide the light emitted from the light irradiator to the light receiver.

11. The encoder according to claim 1, wherein:
an array of the code pattern is an array in which an error correction code indicating information for correcting an error is inserted into a position information data string indicating the position information, and
the light receiver includes:
a position detecting light receiving element configured to read the array of the code pattern, and
a position correcting light receiving element configured to output the information for correcting an error.

12. The encoder according to claim 1, wherein an M-sequence code expressing a one-period position with X bits, a light receiver is constituted by the number of the light receiving elements, the number is greater than 2X, wherein X is an integer.

13. The encoder according to claim 1, wherein the code pattern is only a configuration of one row.

14. A method of operating of an encoder, the encoder includes a moving plate having a code pattern, the code pattern is a position information code and is also an error determination code for an adjacent code, the method comprising:
an irradiating step of irradiating the code pattern with light by an irradiator;
a receiving step of receiving light emitted from the irradiator by a light receiver and passing through the code pattern; and
a determining step including a specifying step of specifying an error portion occurring in a signal derived from the code pattern based on a relationship between a signal derived from the position information code and a signal derived from the error correction code by a determination part, wherein:
the determining step comprises an arithmetic operation step of, when the position information code and the adjacent error correction code have a correspondence relationship, performing an arithmetic operation using the correspondence relationship, with the error correction code being added according to a code value of the arbitrary position information code in which the code patterns are consecutive, and
the specifying step comprises specifying the error portion based on a result of the arithmetic operation.

* * * * *